I. W. McGAFFEY.
Seed-Planter.

No 12,641.

Patented Apr. 3. 1855.

UNITED STATES PATENT OFFICE.

IVES W. McGAFFEY, OF SYRACUSE, NEW YORK.

IMPROVEMENT IN SEED-PLANTERS.

Specification forming part of Letters Patent No. 12,641, dated April 3, 1855.

*To all whom it may concern:*

Be it known that I, IVES W. McGAFFEY, of Syracuse, in the county of Onondaga and State of New York, have invented a new and useful Improvement in Seed-Planters, of which the following is a full, clear, and exact description, reference being had to the accompanying drawings, which form part of this specification, and in which—

Figure 1:
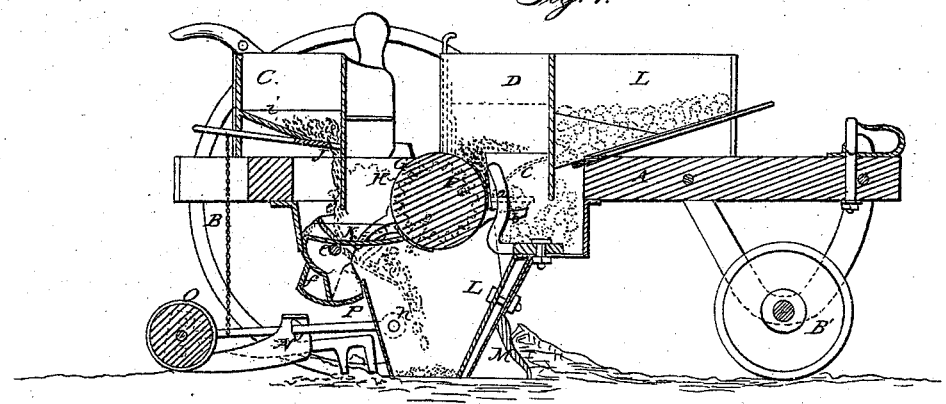
Figure 2:
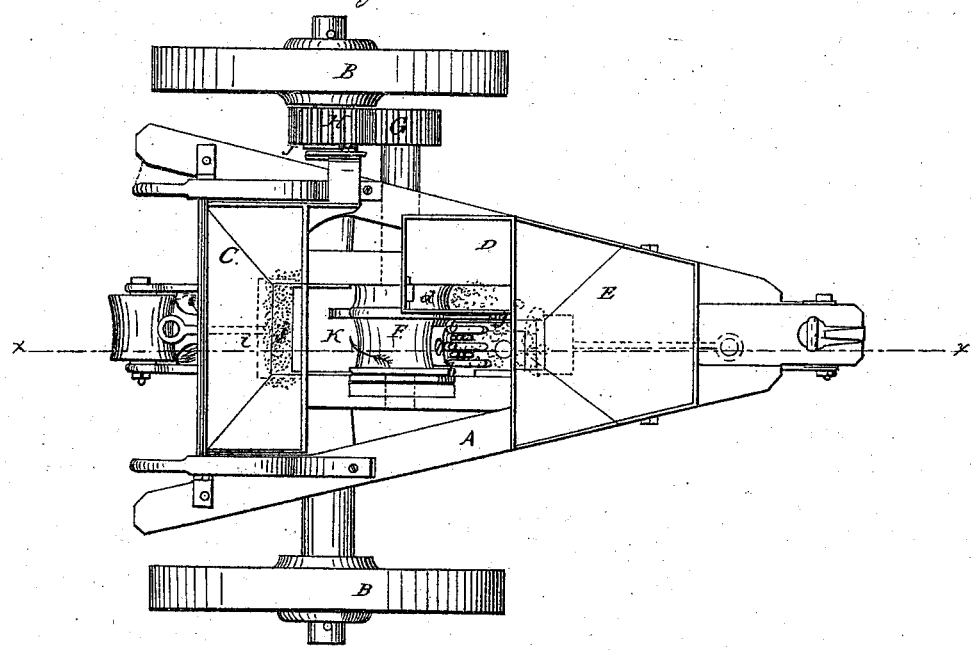

Figure 1 represents a longitudinal vertical section of the planter, taken through the line $x\ x$ in Fig. 2. Fig. 2 represents a plan or top view of the planter.

My improvement has reference to that description of planters in which a fertilizer distributer operates in connection with the seed-planting arrangement.

The planter represented in the accompanying drawings is in most or many of its features common. It has been preferred to illustrate the machine as either a corn or potato planting one, one hopper, E, being arranged for potatoes, and another hopper, D, for corn, the same distributing-roller, F, in its revolution caused by the travel of the machine, taking out the proper quantity of either, the potatoes being dislodged by rake-fingers $b$ and the corn by cavities $d$, both arranged on the periphery of the distributing-roller. This arrangement for discharging from the hopper or hoppers (about which in itself I claim nothing new) is preferred over the various slide and other well-known arrangements, as it is found to answer best in practice, and is (especially for corn) a more certain and gradual one. With such common and reliable form of seed-distributing arrangement, however, my improvement is intimately connected, as will appear from the following description of the arrangement and operation of the fertilizer - distributer: The fertilizing material is represented as contained within a hopper, C, on the other side of the distributing-roller in rear of the machine. The material descends through a slide-regulated opening, $j'$, onto a loosely-suspended tilt-apron, K, that is hung upon a horizontal axis, $e$, and is so constructed and furnished with a weight, $f$, and arranged in relation to and operated by the distributing-roller F that while its own weight keeps it closed and insures a free and easy return after having opened, the distributing-roller F itself opens, at the proper interval, the tilt-apron to discharge its load. Thus not only is the timely discharge of the fertilizing material to the distribution of the seed insured by reason of the tilt-apron K being opened by the distributing-roller, and the liability to irregularity of relative action by the alteration, displacement, or breakage of intermediate loose contrivances avoided, but still further useful effects and advantages are obtained by my arrangement and operation of the tilt-apron K to the distributing-roller F, partly by the position and action of the tilt-apron, which receives the fertilizing material for the most part in the rear, while the grain or seed conveyed by the distributing-roller is deposited in advance of the fertilizing material, but upon the same surface, which is important to insure their timely, proper, and joint deposit in the ground, the tilt-apron having its mouth end opening downward close to the periphery of the distributing-roller, and partly by the manner in which the tilt-apron K is opened—namely, by means of a peg or pegs, $g$, projecting from the periphery of the distributing-roller. These pegs abruptly strike the tilt-apron in front to open it, and by the jar and shock thus produced exert a direct shaking or vibratory effect on the tilt-apron and distributing-roller, which would be wholly or mainly lost were loose, intermediate, or other such positive motions employed, and which serves most effectually to both detach the seed from the distributing-roller, should the seed be inclined to stick, and simultaneously to loosen the fertilizing material (which is very apt to stick) from the face of the tilt-apron, and in this manner and by these means is the proper relative and timely discharge (the seed in advance of the fertilizing material) effected simply and with certainty.

I am aware that a swinging fertilizer-discharge valve in connection with a seed-planter of itself is not new, also that a tilt-apron abruptly operated by cams to discharge accumulated seed let onto it by a separately-driven slide or valve has before been employed; but the relative arrangement, construction, and operation of these parts have been different.

As substantive devices, therefore, or otherwise than as arranged and operating in connection, I do not claim them; but I do claim as new and useful and desire to secure by Letters Patent—

The combination of the fertilizer tilt-apron K with the seed-distributing roller F, constructed, arranged, and operating together substantially as specified.

In testimony whereof I have hereunto subscribed my name.

IVES W. McGAFFEY.

Witnesses:
 WM. M. SMITH,
 A. GREGORY.